Aug. 31, 1937.  J. H. SAIDEL  2,091,885
DENTAL PLATE REFORMING METHOD AND APPARATUS THEREFOR
Filed April 7, 1934  2 Sheets—Sheet 1
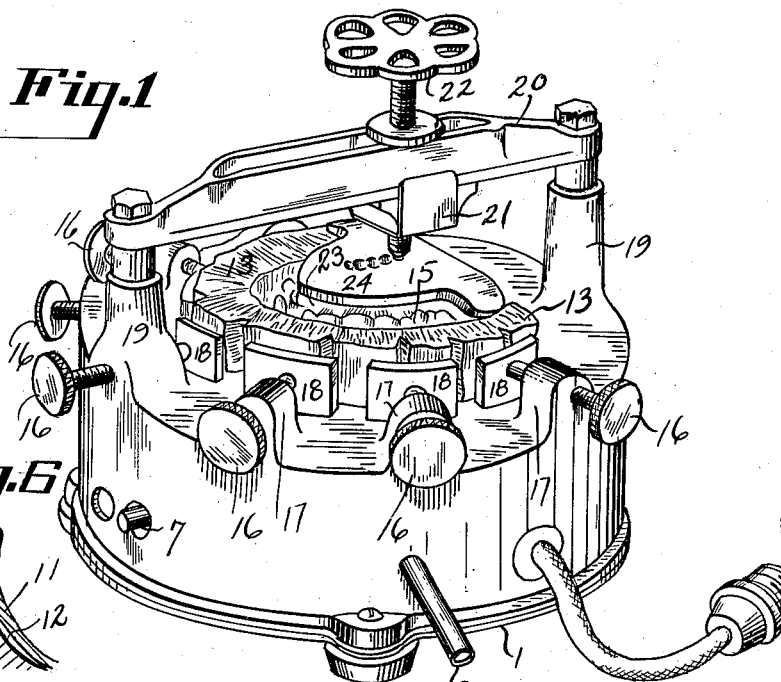
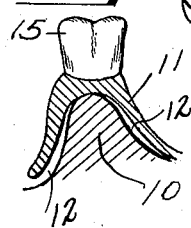
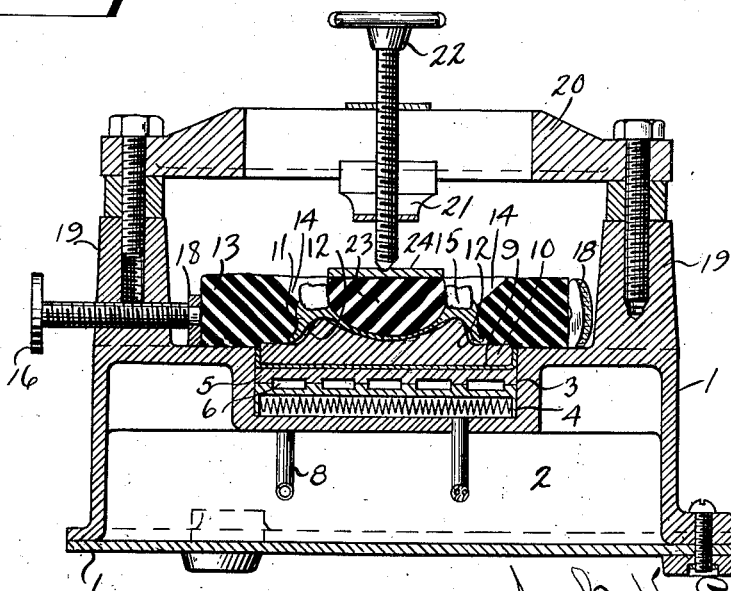
Inventor
Jack H. Saidel
By Walker and Dybvig Attorney Aug. 31, 1937.   J. H. SAIDEL   2,091,885
DENTAL PLATE REFORMING METHOD AND APPARATUS THEREFOR
Filed April 7, 1934   2 Sheets-Sheet 2
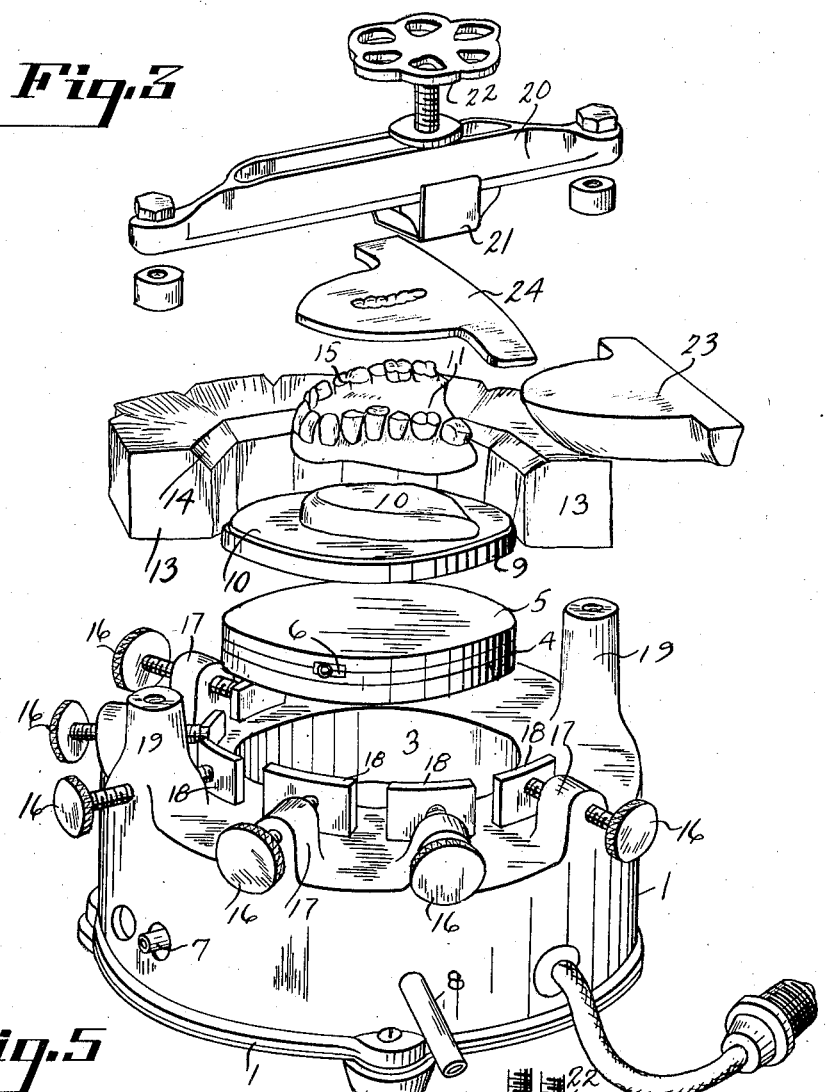
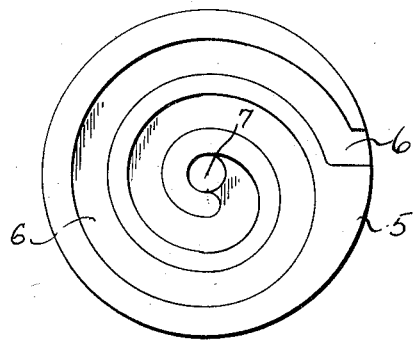
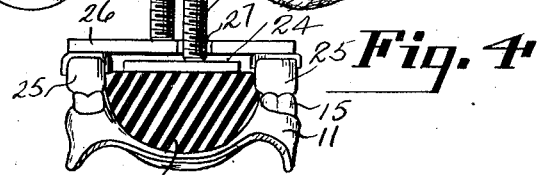
Inventor
Jack H. Saidel
By Walker and Dybvig
Attorney Patented Aug. 31, 1937

2,091,885

UNITED STATES PATENT OFFICE 2,091,885

DENTAL PLATE REFORMING METHOD AND APPARATUS THEREFOR

Jack H. Saidel, Dayton, Ohio

Application April 7, 1934, Serial No. 719,511

11 Claims. (Cl. 18—5.7)

This invention relates to dentistry, and more particularly to a method and apparatus for reshaping misfitting dental plates.

It is a quite common experience that after an artificial denture has been fitted, one's gums will continue to shrink, especially if the dental plate has been fitted soon after teeth have been extracted. Although the plate may fit accurately and closely when made it becomes loose as the gums shrink and tends to shift about and will not retain suction.

It also sometimes occurs that in their manufacture, dental plates will warp or change shape, or due to imperfections of manufacture will not initially properly fit the mouth for which they are intended. The re-making or replacement of illy fitting dental plates being ordinarily quite expensive, the present method and apparatus has been devised to enable such badly fitting dental plates to be reformed and the gum receiving channels thereof to be contracted and reshaped into conformity with the gum by application of heat and pressure over a properly contoured model or plaster replica of the gum.

The object of the invention is to provide a simple and economical method and apparatus for reshaping dental plates which will be efficient in use, rapid in operation, easily controlled, and capable of producing accurate conformation thereof to the gums of the wearer.

A further object of the invention is to provide a method of accurately contouring and reforming either old or new misshapen and badly fitting dental plates.

A further object of the invention is to provide a method of reshaping dental plates by the application of heat and pressure over a properly contoured form.

A further object of the invention is to provide an apparatus for reshaping dental plates which will be of small compact form, capable of being economically manufactured, easily operated and having relatively few parts, and unlikely to get out of order.

A further object of the invention is to provide an apparatus for simultaneously applying to dental plates to be reshaped both heat and pressure.

A further object of the invention is to provide means for enabling the application of heat and pressure thereto to be accurately controlled.

A further object of the invention is to enable pressure to be applied differentially to different portions of a dental plate to be reshaped and the pressure to be localized as may be required.

A further object of the invention is to provide a dental plate reforming apparatus and a method of operation possessing the meritorious features and advantageous characteristics herein mentioned.

With the above primary and other incidental objects in view, as will more fully appear in the specification, the invention consists of the features of construction, the parts and combinations thereof, and the mode of operation, or their equivalents, as hereinafter described and set forth in the claims.

In the accompanying drawings, wherein is shown the preferred but obviously not necessarily the only form of embodiment of the invention, Fig. 1 is a perspective view of a dental plate reforming or reshaping apparatus embodying the present invention and by which the herein described method of procedure may be carried on. Fig. 2 is a transverse sectional view of the apparatus showing a dental plate positioned therein to be reformed or reshaped. Fig. 3 is a perspective view of the apparatus disassembled to disclose the component parts separated from each other. Fig. 4 is a detail sectional view illustrating a modification.

Like parts are indicated by similar characters of reference throughout the several views.

The reshaping and refitting of badly fitting dental plates is a problem which has long confronted the dental profession. The usual procedure has been to build up or thicken the walls of the dental plate by adding material thereto to fill in such places where the plate does not properly conform to and rest upon the gums of the wearer. It has been proposed to reshape plates by a swedging operation by surrounding the plate with heated shot in a conventional swedging apparatus and applying pressure or by hammering upon the plunger of the swedging apparatus. However, such proposed method has not proven successful since there was no means for controlling either the temperature nor the pressure, and such pressure being applied to the teeth as well as to the plate proper tended to distort the dental arch and destroy the occlusion. Therefore, such proposed methods never were practical and were never adopted for use by the dental profession but remained mere experiments. The problem of reforming and refitting dental plates remained ever present. It was to solve this problem in a practical and usable manner that the present method and apparatus has been devised.

Referring to the drawings, the apparatus comprises a base or support 1 which may be of any suitable shape or proportion, but which for compactness and economy of manufacture has been shown as circular and interiorly recessed as at 2. Formed centrally in the top of this support or base 1 is a circular depression or chamber 3, within which is located an electrical heater element 4 over which rests a metal plate 5 having therein a succession of passages 6. The passages 6 may be variously disposed but are preferably of continuous evolute formation and are adapted for circulation of water or steam. For this purpose inlet and exit conduits 7 and 8 lead through the wall of the support or base 1 to the circulatory passages 6 in the plate 5. Located in the chamber 3 and resting upon the plate 5 is a removable flask or pan 9 to contain a plaster cast 10 comprising a replica of the gums to which the dental plate is to be fitted.

This plaster replica of the wearer's gums may be produced in the usual manner by having the person bite upon a quantity of molding or impression taking material when in plastic condition to form therein an accurate impression of the gums and then after hardening the impression material, making therefrom a plaster cast 10 within the flask or pan 9 which will be in exact agreement with the contour, size and shape of the wearer's gums.

As an alternative method of securing such replica model, the interior of the gum channel or recess of the misshapen or badly fitting dental plate may be coated with plastic molding or impression taking material, and the plate placed within the mouth and the bite taken which will displace the molding or impression taking material, causing it to accurately fill any interstices between the gums and the wall of the plate so that the plate with such filling or molding, or impression taking material, will accurately conform to the wearer's gums. The plaster cast 10 may then be made from the plate with its filling of impression material, thus affording a replica of the gums. The impression taking material is then removed from the dental plate which is to be reformed and reshaped into conformity with the wearer's gums.

The plaster model or cast thus produced being an exact replica of the wearer's gums, the plate to be reformed is placed thereon and will occupy the same relation to the plaster model or cast that it bears to the wearer's gum. That is to say, it will not conform to the plaster cast or model but will rest upon the crown of that portion of the model or cast corresponding to the gum ridge, but will stand away more or less at the sides of the model or cast. Thus there will be intervening spaces 12 intermediate the plate 11 and the model or cast 10 which will be closed by deflection of the material of the plate into conformity with the plaster cast or model by applying pressure to the plate while in a heated condition.

Disposed exteriorly about the dental plate 11 when resting upon the model or cast 10 is a compression strip 13 of rubber or other compressible and expansible material. This strip 13 is beveled at 14 so that the compression strip will bear only upon the exterior side or flange of the dental plate beyond the line of the teeth 15. In reforming the plate, it is desirable that the teeth 15 be not disturbed by pressure which might distort the dental arch or destroy the occlusion.

Radially disposed upon the support or base 1 is a series of clamp screws 16, each of which is threaded through a lug or ear 17 projecting from the base 1 and carries at its inner extremity a pressure head 18 bearing upon the compression strip 13. By adjustment of the screws 16, the compression strip 13 is compressed or tensioned which pressure is transmitted thence to the outer flange or wall of the dental plate 11. By independently adjusting the different screws 16 such contractive pressure may be differentially distributed or may be localized upon selected portions of the plate as may be required. Projecting upwardly from the top of the base or support 1 are oppositely disposed uprights or posts 19 which carry a transverse slotted bridge bar 20. Slidingly mounted upon the bridge bar 20 for to and fro adjustment is a sliding head 21 in which is threaded a pressure screw 22 for exerting downward pressure in a direction perpendicular to the pressure plane of the adjusting screws 16. A rubber pallet or body of other compressible and expansible material 23, shaped to approximately conform to the interior of the dental plate and exert pressure thereon beyond the line of the teeth 15, is located within the plate 11 and a metallic pressure plate 24 is superposed thereon to receive the pressure of the adjustable screw 22. The sliding adjustment of the head 21 and screw 22 allows pressure to be applied in different positions as may be necessitated by difference in size and shape of different plates.

The dental plate to be reformed being positioned as before described upon the model or cast of the patient's gums and the compression strip 13 being disposed exteriorly thereabout and the pad or pallet 23 being located therein, and the several screws 16 and 22 having been adjusted to put the plate under compressive tension, the heating element 4 is energized to supply sufficient heat to reduce the dental plate 11 to a pliable condition. As the plate is softened the expansion of the compression strip 13 and the pad or pallet 23 automatically deforms the plate into exact conformity with the plaster cast or model 10. This compression of the plate and deflection of the softened material may be augmented during the process by increasing the pressure from time to time upon the respective screws 16 and 22 or upon selected screws thereof to increase or decrease the localized pressure upon different portions of the plate. Thus the degree of pressure is under direct and constant control of the operator as is also the degree of temperature which may be regulated by controlling the supply of current to the electric heater element 4. After the plate has been sufficiently softened to render it pliable and has been pressed into conformity with the model or cast 10, the current is turned off the heating element 4 and the plate is allowed to cool and set in its reformed shaped. To assist the quick setting or cooling of the plate, water may be introduced through the inlet 7 into the circulatory passage 6 of the plate 5 which serves to cool the plate and with it the plastic cast 10 and reformed plate 11 more rapidly, the spent or warmed water being discharged through the outlet 8.

It is also quite possible and feasible to heat the plate to the desired degree of pliability by the circulation of live steam through the circulatory conduit 6 of the plate 5 without using the electrical heater element 4.

While, as before mentioned, it is desirable that the teeth 15 be relieved of pressure during the reforming and reshaping operation in order that the dental arch shall not be disturbed nor the disposition of the teeth therein changed, under certain conditions it may be desirable to apply a limited pressure uniformly to the teeth to hold them fixedly upon the plaster cast or model 10 while pressure is being exerted laterally against the walls or flanges of the plate. To this end, a plaster cast 25 may be made of substantially U-shape and conforming to the crown of the tooth assembly. This cast is rested upon the crowns of the teeth, as illustrated in Fig. 4, and superposed by a pressure plate 26 by which limited pressure may be applied to hold the plate firmly against the plaster cast. If desired the supplemental plate 26, bearing upon the cast 25, may be provided with an opening as at 27 to receive the pressure screw 22 by which pressure may be applied to the pad or pallet 23 independently of that applied to the supplemental cast 25.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. In an apparatus for reshaping misfitting dental plates, a support adapted to receive a flask to contain a plaster cast of the gums of the wearer upon which is to be disposed a misshapen dental plate to be reformed, an electric heater for heating the plaster cast and plate carried thereby to reduce the plate to a pliable condition, a rubber strip to encircle exteriorly the plate to be reformed, multiple pressure devices disposed in different radial positions for subjecting the rubber strip to differential localized pressures in inwardly directed radial directions, a rubber pallet for disposition within the dental plate, and a pressure device for subjecting the rubber pallet to pressure in a direction substantially perpendicular to said radially acting multiple pressure devices, said pressure devices being operative to force the dental plate when pliable into conformity with the plaster cast.

2. In an apparatus for reshaping misfitting dental plates, a support for a replica form of the wearer's gums, over which is to be disposed the dental plate to be reshaped, means for subjecting the dental plate to sufficient heat to render it pliable, independent resilient unitary bodies disposed interiorly and exteriorly respectively of the dental plate to be reformed, each of said bodies being spaced from the dental teeth, means for placing said bodies under compression whereby the subsequent compression of the bodies against the plate when pliable deforms the plate into conformity with the replica of the wearer's gums.

3. In an apparatus of the character described, a support to receive a replica cast of a person's gums, over which is to be disposed a misshapen dental plate to be reformed, heater means for reducing the dental plate to a pliable condition, a compressible and expansible body surrounding the plate when upon the cast, a second compressible and expansible body located interiorly of the plate when on the cast, and means for compressing the respective bodies to mold the plate while pliable into conformity with the replica cast.

4. The herein described method of reshaping misshapen dental plates including producing a replica form of the gums of the wearer, positioning the plate to be reshaped over such form, reducing the plate to a pliable condition and applying varying pressures to localized portions thereof spaced from the teeth, by which the plate channel is made to conform to the shape of the form without disturbing the dental arch or disposition of the teeth therein.

5. In an apparatus for reshaping misfitting dental plates, a support to receive a replica cast of a person's gums, over which is to be disposed a misshapen dental plate to be reformed, heater means for reducing the dental plate to a pliable condition, means for confining the interior of the plate and pressure means for applying different contractive pressures to different areas of the exterior of the dental plate beyond the line of teeth and spaced therefrom to force said exterior into conformity with the cast.

6. The herein described method of reforming misshapen dental plates including the steps of producing a replica form of the wearer's gums, positioning the non-fitting dental plate thereon, applying heat sufficient to soften the plate material, confining the interior portion of the plate and applying a pressure to the exterior portion extending below the line of teeth thereof only for pressing the exterior portion into conformity with the outer portion of the form without disturbing the dental arch or the disposition of the teeth therein.

7. In an apparatus for reshaping misfitting dental plates, a support to receive a replica cast of a person's gums over which is to be disposed a misshapen dental plate to be reformed, heater means for reducing the dental plate to a pliable condition, yielding means including a horse-shoe-like rubber member for applying a contractive pressure to the exterior of the dental plate beyond the line of teeth to force said exterior into conformity with the cast.

8. In an apparatus for reshaping misfitting dental plates, a support to receive a replica cast of a person's gums over which is to be disposed a misshapen dental plate to be reformed, heater means for reducing the dental plate to a pliable condition, yielding means including a rubber pallet for disposition on the portion of the plate extending between the line of teeth of the dental plate for subjecting said interior to expansive pressure to conform the same into conformity with the cast.

9. In an apparatus for reshaping misfitting dental plates, a support to receive a replica cast of a person's gums over which is to be disposed a misshapen dental plate in pliable condition to be reformed, pressure means including a resilient pallet member for disposition on the portion of the plate extending beyond the line of teeth for subjecting said interior to expansive pressure into conformity with the cast.

10. In an apparatus for reshaping misfitting dental plates, a support to receive a replica cast of a person's gums over which is to be disposed a misshapen pliable dental plate to be reformed, a plurality of radially disposed members, each abutting a resilient member for applying varying contractive pressures to different areas of the exterior of the dental plate beyond the line of teeth and spaced therefrom to force said exterior into conformity with the cast.

11. In an apparatus for reshaping misfitting dental plates, a support to receive a replica cast of a person's gums over which is to be disposed a misshapen dental plate in pliable condition to be reformed, pressure means including a horse-shoe-like resilient member for applying localized contractive pressure to the exterior of the dental plate beyond the line of the teeth and spaced therefrom to force said exterior into conformity with the cast.

JACK H. SAIDEL.